Aug. 15, 1939.   E. GROTE   2,169,639
CLUTCH MECHANISM FOR CHANGE-SPEED GEARS
Filed May 20, 1936   2 Sheets-Sheet 1

E. Grote
INVENTOR

Glascock Downing & Seebold
ATTYS.

Aug. 15, 1939.  E. GROTE  2,169,639
CLUTCH MECHANISM FOR CHANGE-SPEED GEARS
Filed May 20, 1936  2 Sheets-Sheet 2

Patented Aug. 15, 1939

2,169,639

UNITED STATES PATENT OFFICE 2,169,639

CLUTCH MECHANISM FOR CHANGE-SPEED GEARS

Edward Grote, Berlin-Wilmersdorf, Germany

Application May 20, 1936, Serial No. 80,892
In Germany January 5, 1935

4 Claims. (Cl. 192—87)

This invention relates to a change-speed gear of the kind in which a plurality of separate speeds is provided and any particular gear train is in each case put in operation by causing from among a plurality of clutch discs or sets of clutch discs the engagement of individual ones selectively by means of hydraulic or pneumatic, extensible pressure chambers.

Figure 1:
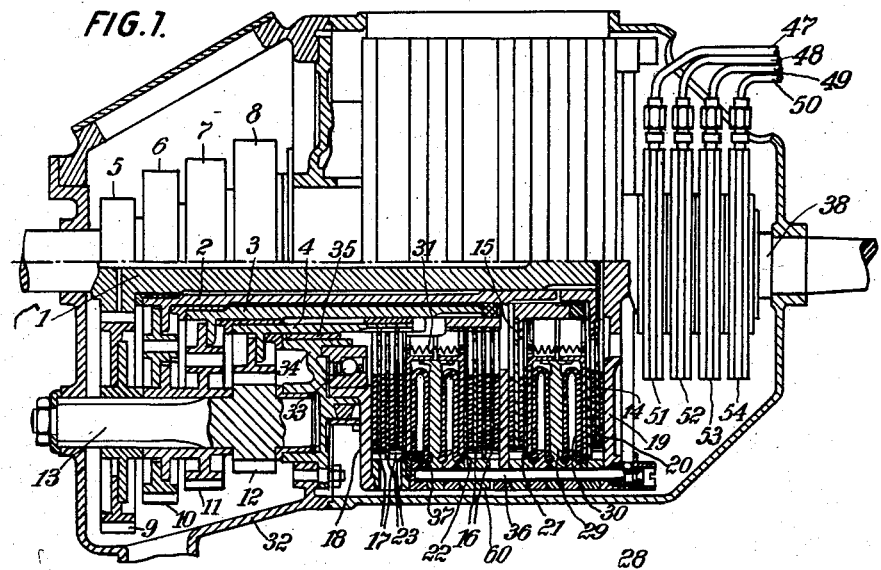
Figure 2:
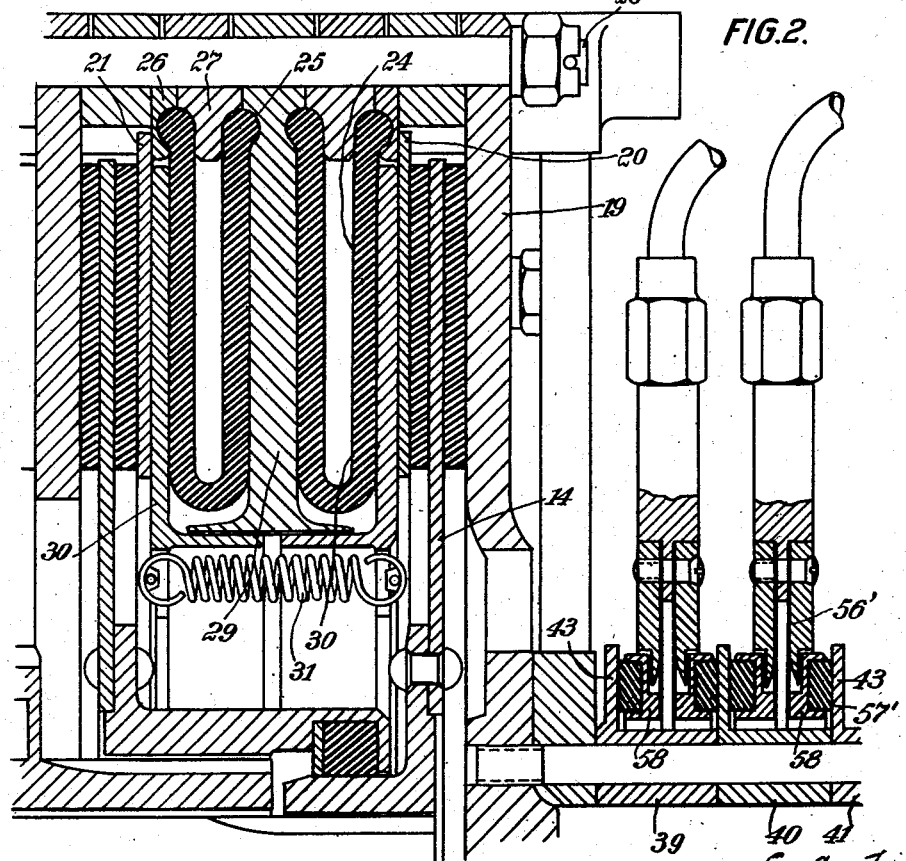
Figure 3:
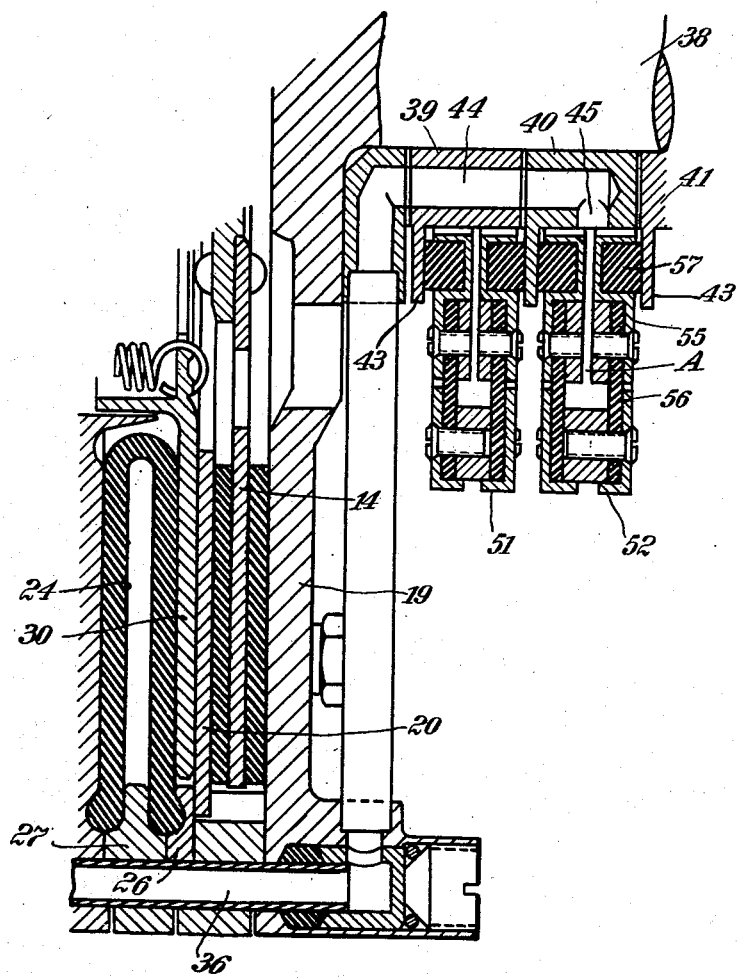

The invention is illustrated by way of example in the accompanying drawings, in which Fig. 1 is an elevation and part longitudinal section through the change-speed gear, Fig. 2 an elevation and longitudinal section through parts of the change-speed gear to a larger scale and Fig. 3 a longitudinal section through parts of a modified form of the gear.

In the drawings, 1 designates a gear shaft driven directly by an engine (not shown). The numerals 2, 3, and 4 designate gear shafts driven indirectly by said engine through the gear wheels 5, 9, 10, 11, 12 and 6, 7 and 8. The gear wheels 9, 10, 11 and 12 are mounted on a countershaft or jack shaft 13, and this assembly constitutes what is generally known as a stepped wheel gearing. On these shafts clutch discs or sets of clutch discs 14, 15, 16, 17 are mounted in a known manner and are so connected that they must take part in the rotary motion of these shafts.

In a drum-like rotary body, the end walls of which are shown at 18, 19 other clutch discs 20, 21, 22, 23 are held by any suitable means at their outer periphery.

According to the invention there are disposed between these clutch discs hydraulic or pneumatic, extensible pressure chambers which are formed by hollow bodies 24 of U-shaped cross-section, which are open at the outer periphery and are there held rigidly. The hollow bodies are preferably of rubber, have a thickening 25 at their outer edge and are clamped in pressure-applying rings 26, 27 which are pressed axially against one another. The clamping pressure is produced in a simple manner by means of bolts 28 which are distributed round the periphery of the drum.

In the constructional example shown a common rigid wall 29 is provided as an abutment for the hollow bodies of each two adjacent clutches. By intermediate rings 30 alone or in combination with the rigid wall 29 just referred to, chambers are formed for the U-shaped hollow bodies and returning springs 31 are provided, which, on a speed being changed, release these intermediate discs again from the clutch discs.

It is of importance for the general arrangement, that the U-shaped hollow bodies together with the clutch discs associated with them are arranged outside the gear housing 32. This arrangement makes it possible for the gear wheels to be maintained in grease or oil, while the clutch discs of the change-speed gear may be constructed as dry discs, and kept dry during operation of the device.

Such an arrangement enables the individual parts to be particularly easily journalled. Preferably the rotary body or drum 60 having ends 18, 19 is journalled by means of a ball bearing 33 externally on the casing wall 34 of the wheel casing 32, while the gear shafts 1, 2, 3, 4 are journalled one within the other and extend through the interior of the part 34 of the casing wall as indicated at 35.

It is of particular importance that the pressure medium shall be conveyed to the U-shaped hollow bodies 24 from the outside. For this purpose tubes 36 are provided which extend parallel to the axis of the gear and of which preferably two for each speed are disposed at opposite sides, at an angle of approximately 180° relative to the rotary body. For the first speed the place of introduction of the pressure medium into the interior of the U-shaped hollow body is indicated at 37.

For conveying the pressure medium to the individual tubes 36 the following arrangement is provided:

On a driven shaft 38 (Fig. 1) arranged in axial alignment with and driven by the main or gear shaft 1 rings 39, 40, 41 and so on corresponding to the different speeds are mounted, and are rigidly connected to the said shaft. These rings have flanges 43 and bores 44 and 45, which are connected in each case by distributing passages of any kind with the tubes 36.

For the conveyance of the pressure medium from pressure medium pipes 47, 48, 49, 50 stationary chambers 51, 52, 53, 54 are provided. These chambers have side walls 55 which are clamped by means of a diaphragm-like body 56 in such a manner that their inner surfaces are angularly movable. In the constructional example shown in Figure 3 ring-shaped rubber discs are provided for this purpose. The arrangement is made such that in the interior a certain annular gap which forms a chamber A is provided. The parts 55 act as frames for packing rings 57 made of self-lubricating material, for instance, graphite, carbon or the like. These packing rings press against the flanges 43 under the pressure of the through-flowing pressure medium and prevent the pressure medium escaping at this place.

In many cases it is desirable to reduce the pressure of the packing rings 57 against the flanges 43, and for this purpose a constructional form such as that shown in Fig. 2 is used. In this case as well diaphragms 56' are clamped in, which are capable of moving apart at their inner ends under the action of the through-flowing pressure medium. For reducing the pressure a frame 58 is provided, which in the constructional example illustrated reduces the pressure of the pressure rings 57' against the flanges 43 to about half. This is effected through the frame of the packing rings being loaded with pressure internally over a smaller surface than corresponds to the surface of the packing rings.

The main advantages of such a change-speed gear are the elimination of complicated mechanical parts which are required in a change-speed gear having mechanical friction clutches, a compact light construction, the possibility of employing the advantageous dry clutch discs, the possibility of changing the various speeds without pause, slight and shock-free stressing of the gear wheels, of the engine and of the transmission parts of the vehicle and a sparing of the U-shaped hollow bodies, even when made of rubber, through their being held at the outer edge, as they are not stressed in tension by the centrifugal force.

Having now particularly described and ascertained the nature of my said invention and in what manner the same is to be performed, I declare that what I claim is:

1. A pneumatic clutch mechanism of the character described, comprising a plurality of clutch disks, expansible hollow members of U-shape in cross-section arranged between the clutch disks for actuating the latter, said members being open at their outer periphery, means rigidly holding said hollow members at their outer peripheries and for closing the latter, and means for admitting a pressure medium in the interior of the members through the first mentioned means for expanding said members.

2. A pneumatic clutch mechanism of the character described comprising a plurality of clutch disks, expansible hollow members of U-shape in cross-section arranged between the clutch disks for actuating the latter, said members being open at their outer periphery and having enlarged edges, pressure rings engaging the enlarged edges of said members and adapted to be pressed axially against one another for holding said hollow members at their outer peripheries and for closing the latter, and means for admitting a pressure medium in the interior of the members through said pressure rings for expanding said members.

3. A pneumatic clutch mechanism of the character described, comprising a plurality of clutch disks, expansible hollow members of U-shape in cross-section arranged between the clutch disks for actuating the latter, said members being open at their outer periphery, means rigidly holding said hollow members at their outer peripheries and for closing the latter, and means for admitting a pressure medium in the interior of the members through the first mentioned means for expanding said members and means including draw springs normally tending to contract said hollow members.

4. A clutch mechanism for change speed gearing comprising a clutch disk, an expansible hollow member of U-shape in cross section adapted to engage said disk for actuating the latter, said member being open at its outer periphery, means engaging the outer periphery of said member and closing the latter, and means for admitting a pressure medium in the interior of said U-shaped member through said first mentioned means for expanding said hollow member into engagement with the clutch disk for actuating the latter.

EDWARD GROTE.